United States Patent
Beasley et al.

[11] Patent Number: 5,903,515
[45] Date of Patent: May 11, 1999

[54] SPATIAL DE-ALIASING OF THE 3-D KIRCHHOFF DMO OPERATOR

[75] Inventors: Craig J. Beasley; Everett C. Mobley, both of Houston, Tex.

[73] Assignee: Western Atlas International, Inc., Houston, Tex.

[21] Appl. No.: 08/832,632

[22] Filed: Apr. 4, 1997

[51] Int. Cl.$^6$ .............. G01V 1/20; G01V 1/28; G01V 1/36

[52] U.S. Cl. .............. 367/59; 367/21; 367/53; 367/63

[58] Field of Search .............. 367/21, 53, 59, 367/63

[56] References Cited

U.S. PATENT DOCUMENTS

| | | | |
|---|---|---|---|
| 5,198,979 | 3/1993 | Moorhead et al. | 364/421 |
| 5,206,837 | 4/1993 | Beasley et al. | 367/38 |
| 5,285,422 | 2/1994 | Gonzalez et al. | 367/53 |
| 5,450,370 | 9/1995 | Beasley et al. | 367/53 |
| 5,677,892 | 10/1997 | Gulunay et al. | 367/38 |
| 5,764,514 | 6/1998 | Raynaud et al. | 364/420 |

OTHER PUBLICATIONS

Beasley et al, 67th Annu. SEG Int. Mtg., vol. 2, pp. 1119–1122, Paper No. SP3–7; Nov. 7, 1997.

Herrmann et al, 67th Annu. SEG Int. Mtg., vol. 2, pp. 1159–1162, Paper No. SP4–9, Nov. 7, 1997.

Silva et al, 9th ASEG et al. Geophys. Conf. vol. 23, #1–2, pp. 305–309, Oct. 8, 1992.

Beasley et al, 58th Annu. Loc. Expl. Geophys. Int. Mtg., vol. 2, pp. 1113–1116, Nov. 3, 1988.

Beasley et al, 62nd Annu. SEG Int. Mtg., pp. 970–973, PAP. No. SM 3–6, Oct. 29, 1992.

Beasley, C.J.; 63rd Annu. SEG Int. Mtg. pp. 544–547, PAP No. SA1–6, Sep. 30, 1993.

DMO in Arbitrary 3–D Acquisition Geometries; GIJS J.O. Vermeer, Shell Research Rijswijk, The Netherlands, et al; SP4.5; pp. 1445–1448.

3D DMO for Cross–Spread Geometry: A Practical Approach and Application to Multi–Fold Field Data; Nicholas J. Cooper, et al, Digicon Geophysical Ltd.; PR2.8; pp. 1483–1486.

*Primary Examiner*—Nelson Moskowitz
*Attorney, Agent, or Firm*—William A. Knox

[57] ABSTRACT

A method for generating an unaliased 3-D DMO operator using two dimensional sampling theory to the spatial traverse of the operator as well as to the temporal axis. First a continuous DMO operator is generated along the line segment connecting a source and a receiver directed at an arbitrary azimuth relative to a biaxial output grid. The operator is discretized at spaced-apart sample points along the DMO aperture segment, the spacing being equal to or less than the output grid dimensions. A exponentially tapered sinc filter function is applied to the samples which are then interpolated onto the output grid.

7 Claims, 7 Drawing Sheets

SPATIAL DE-ALIASING OF THE 3-D KIRCHHOFF DMO OPERATOR

BACKGROUND OF THE INVENTION

1. Field of the Invention

This invention relates to a methodology for preventing dip-induced spatial aliasing of the 3-D Kirchhoff DMO operator applied to data acquired along random trajectory azimuths.

2. Discussion of Related Art

As is well known to geophysicists, a sound source, at or near the surface of the earth, is caused periodically to inject an acoustic wavefield into the earth at each of a plurality of regularly-spaced survey stations. The wavefield radiates in all directions to insonify the subsurface earth formations whence it is reflected back to be received by seismic sensors (receivers) located at designated stations at or near the surface of the earth. The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later processing. The travel-time lapse between the emission of a wavefield by a source and the reception of the resulting sequence of reflected wavefields by a receiver, is a measure of the depths of the respective earth formations from which the wavefield was reflected.

The seismic survey stations of a 3-D survey are preferably distributed in a regular grid as in FIG. 1 over an area of interest with inter-station grid spacings, dx and dy on the order of 25 meters. The processed seismic data associated with a single receiver are customarily presented as a one-dimensional time scale recording displaying rock layer reflection amplitudes as a function of two-way wavefield travel time. A plurality of seismic traces from a plurality of receivers sequentially distributed along a line of survey such as 10 or 12 may be formatted side-by-side to form an analog model of a cross section of the earth (two-dimensional tomography). Seismic sections from a plurality of intersecting lines such as 10 and 12 of survey distributed over an area of interest, provide three-dimensional tomography.

To provide some definitions, the term "signature" as used herein means the variations in amplitude and phase of an acoustic wavelet (for example, a Ricker wavelet) expressed in the time domain as displayed on a time scale recording. The impulse response means the response of the instrumentation (source, receivers, data-processor, transmission link, earth filter, etc.) to a spike-like Dirac function. To prevent aliasing, the sample interval (spatial or temporal) must be less than half the signal period. DMO (dip moveout) is an imaging operator that offers a stratagem for correcting the reflection-point smear that results from stacking of dipping reflections.

If we can assume constant velocity, the 3-D Kirchhoff DMO operator is simply the 2-D DMO operator constructed along an arbitrary source-receiver trajectory. In FIG. 1. the line segment 10 containing the data, lying between the source, $S_1$, and the receiver (sensor), $R_1$, is the DMO aperture along that azimuth. Line 12 represents a DMO aperture lying along some other randomly-chosen azimuth. The grid-line intersections represent the stack output points or bins. The output grid points are characterized by biaxial, preferably but not limited to, orthogonal boundaries of preselected dimensions.

Theoretically, the aperture is a continuum. But in order to stack the impulse responses, the continuous aperture must be discretized in surface coordinates x and y as shown in FIG. 1. Conventionally that is done by stacking discretely sampled points along the aperture at the nearest output grid point. If the source-receiver azimuth is not favorably oriented in relation to the 3-D grid, spatial aliasing of the DMO operator results. In FIG. 2, 14 is an example of a conventionally discretized DMO aperture. Observe the stair-stepping distortion. FIG. 3 is the 2-D spectrum of the DMO aperture shown in FIG. 2 for $-\pi<kx,ky<+\pi$, demonstrating the wrap-around aliasing thereof, where kx and ky are the wavenumbers in the x and y coordinates.

Early students of DMO application to 3-D geometries along arbitrary azimuths include Vermeer et al. and Cooper et al. Vermeer, in a paper entitled DMO in arbitrary 3-D acquisition geometries, presented at the 66th meeting of the Society of Exploration Geophysicists (1995) and published as Expanded Abstract paper, pp 1445–1448 showed that for cross spread geometry, the locus of contributing midpoints for a given output point is a hyperbola in the (x,y) plane passing through the output point, provided the data are sampled alias-free. However in actual practice, according to Vermeer, correct, alias-free sampling of the hyperbolas is difficult to achieve. Even in regularly sampled data, the result of 3-D DMO is suboptimal.

The following year, Cooper et al, at the 1996 meeting of the Society of Exploration Geophysicists delivered a paper entitled 3-D DMO for cross spread geometry: a practical approach in multifold-field-data, which is published in the Expanded Abstracts, pp 1483–1486. Cooper follows the pathway marked by Vermeer except that he spatially over-samples the input data prior to "smiling" the data along the source-receiver azimuth. This technique results in improved signal-to-noise ratio but at a very considerable increase in computational costs due to the over sampling and the finer resolution of the "smiles".

There is a need for a practical, computationally efficient method for spatial de-aliasing of the 3-D Kichhoff DMO operator.

SUMMARY OF THE INVENTION

A method for spatially de-aliasing the impulse response of a 3-D Kirchhoff DMO operator directed along a DMO aperture segment aligned along an arbitrary azimuth with respect to an array of output cells distributed over a biaxial spatial x–y coordinate grid. The cell boundaries are characterized by preselected dimensions in the x, y coordinates. The DMO aperture segment is sampled at uniformly spaced discrete sample points. The spatial interval between sample points is equal to or less than the greater of the cell boundary dimensions. Each sample point is interpolated onto the output grid by applying a sampling filter having a pass band within Nyquist wave numbers defined by the output grid. The filter is centered over the DMO output grid point nearest to the sample point under consideration. The filter is truncated to a pre-selected odd number, greater than unity, of weighted filter coefficients derived from a like number of cells resident in a surrounding support region associated with the DMO aperture segment. The filtered DMO response of the sample point is stacked at the output grid points within the filter support region.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
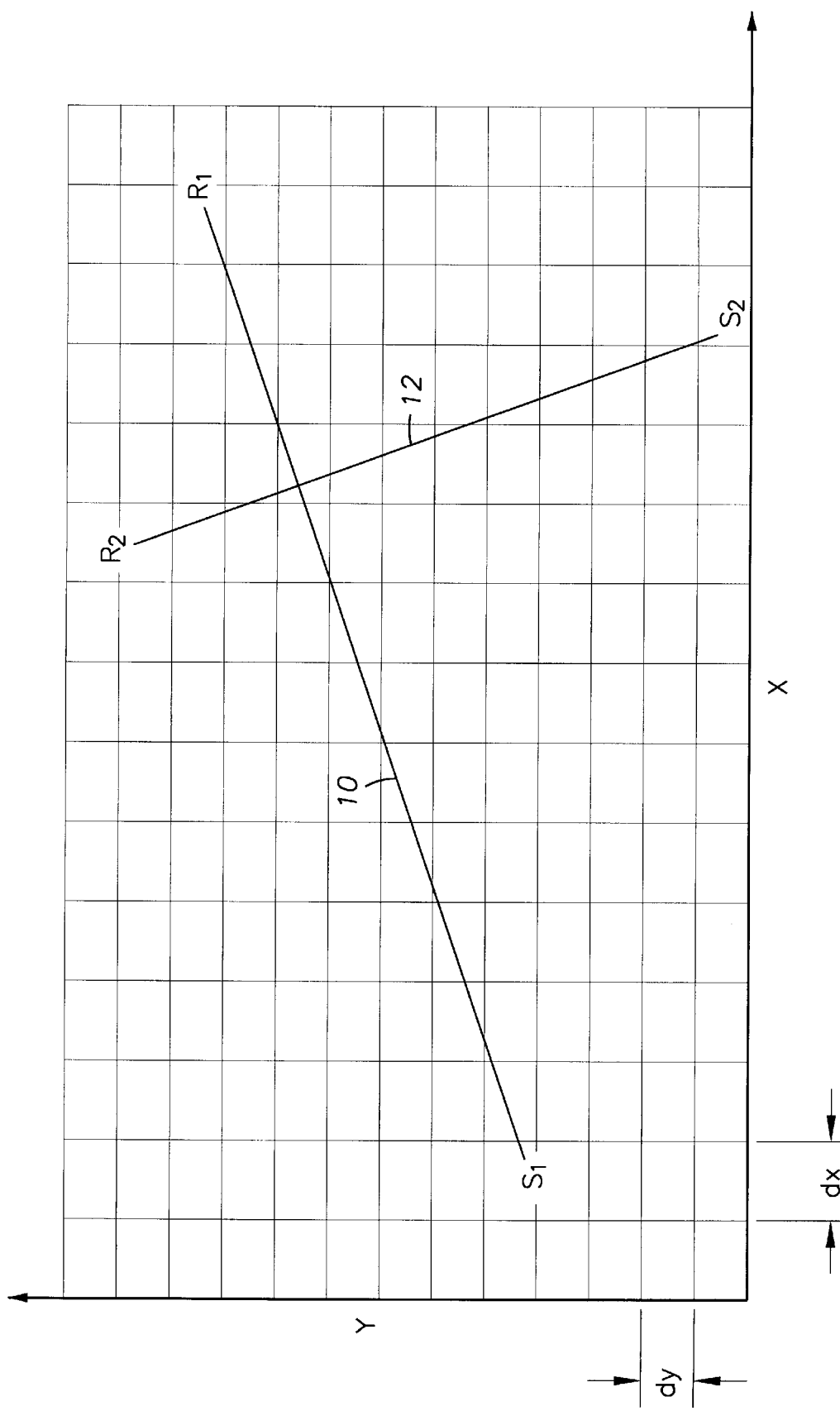
FIG. 1 is presented to clarify definition of terms used herein.
Figure 2:
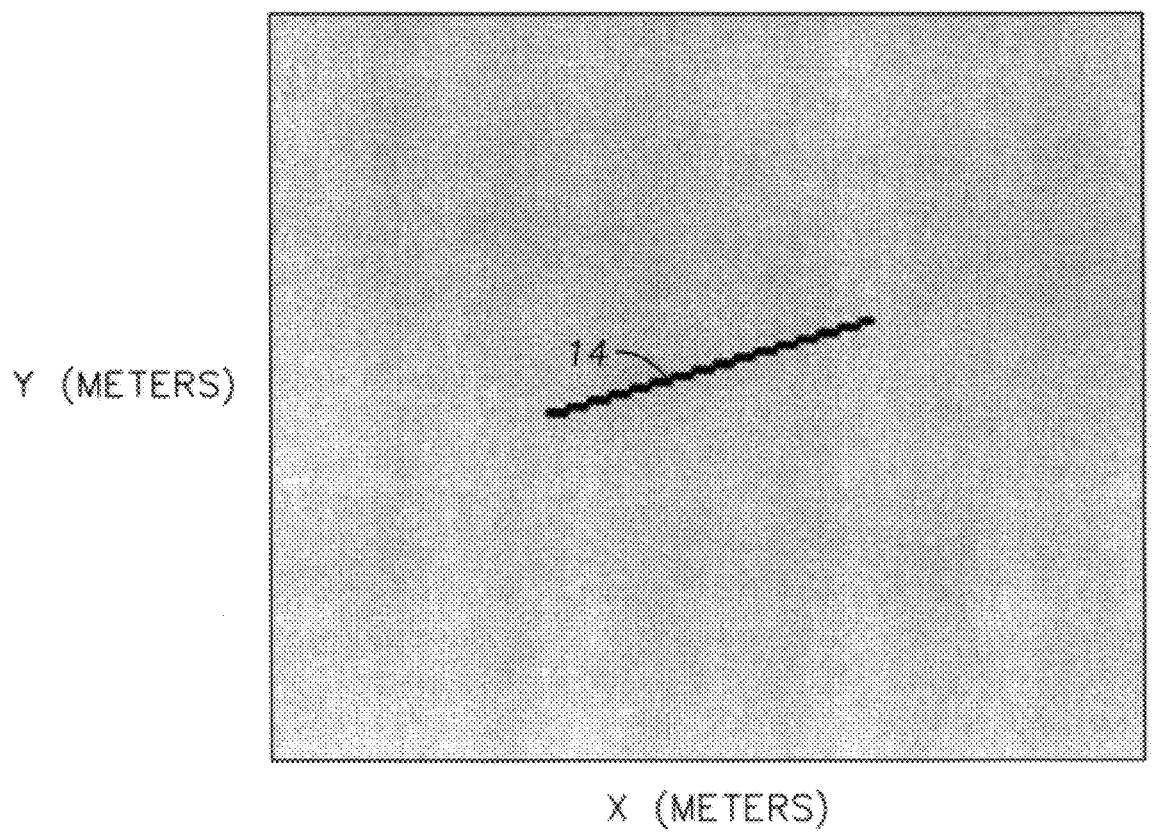
FIG. 2 is an example of an DMO operator as conventionally discretized.
Figure 3:
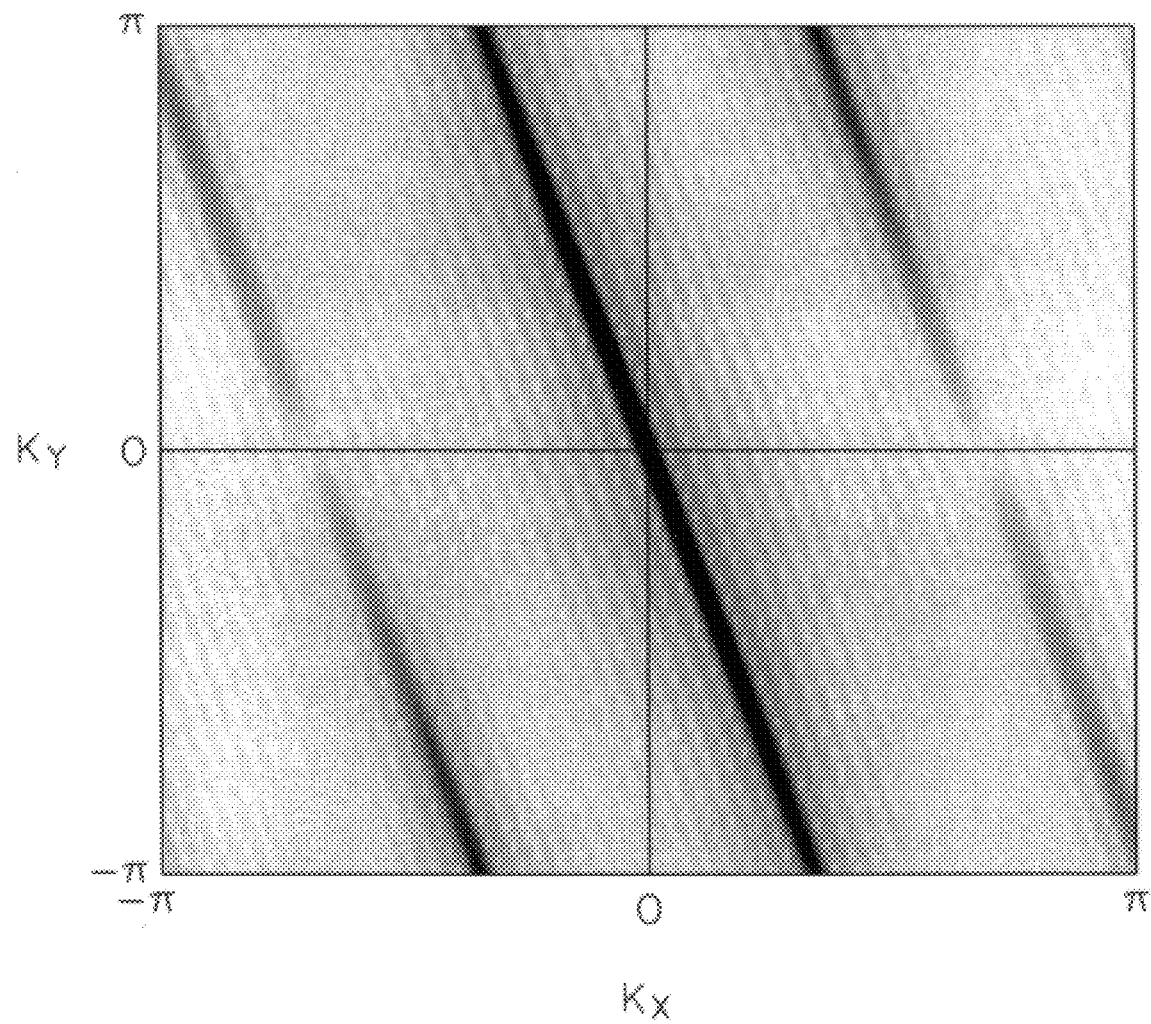
FIG. 3 is the spectrum of FIG. 2 showing aperture aliasing.

The evils of spatial aliasing, using conventional data-processing methods, were demonstrated earlier with respect to FIGS. 1–3. An improved, economical method for de-aliasing a 3-D Kirchhoff DMO operator will now be explained.

Figure 4:
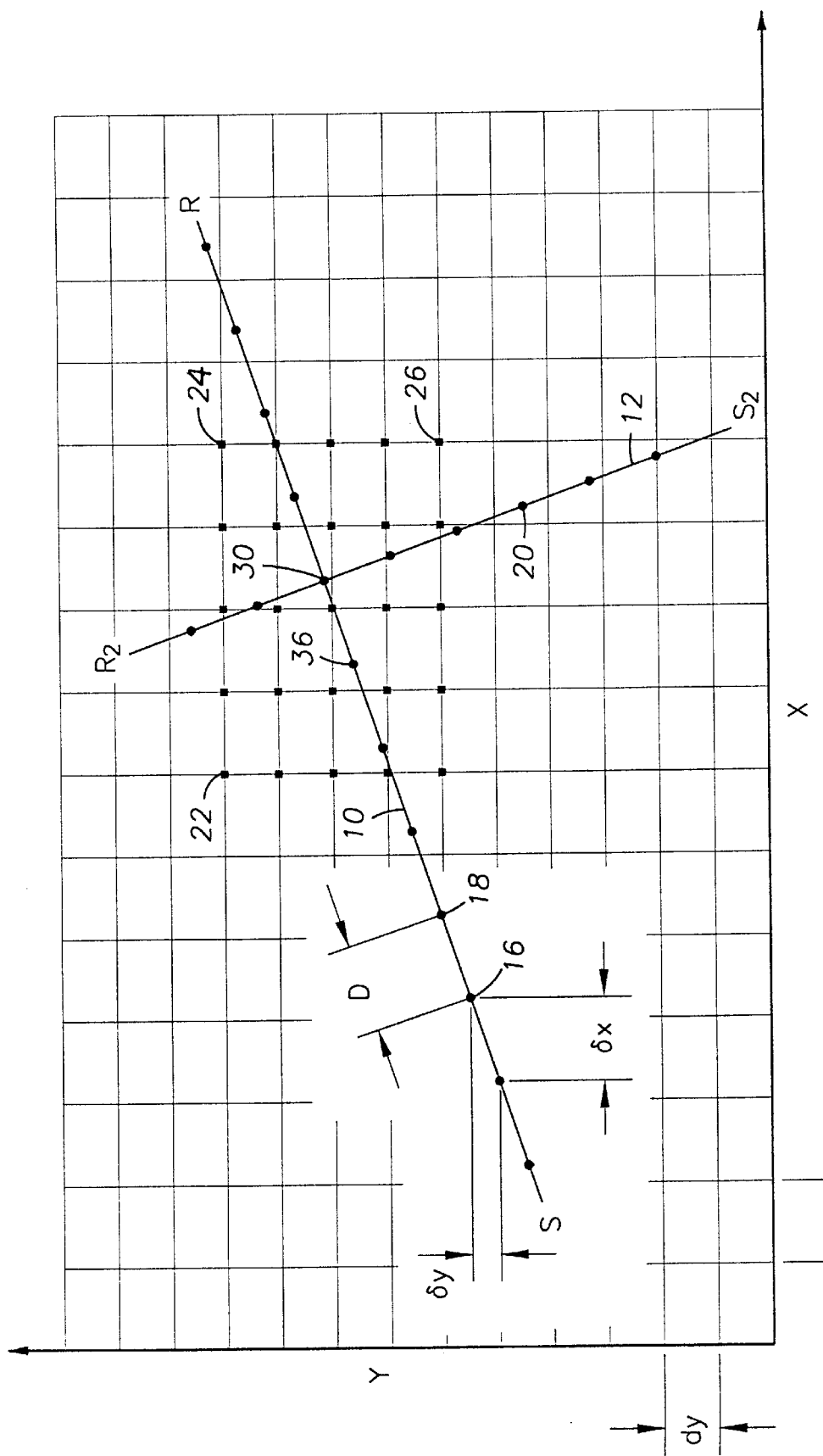
FIG. 4 illustrates two DMO aperture segments directed along arbitrary azimuths showing the arrangement of DMO sample points and the surrounding grid points that make up the filter support region.

Please refer to FIG. 4 which illustrates a portion of an area of interest. As before, the grid lines intersect at stacked output locations. As is well known, in the normal course of seismic survey operations, each output point is, in effect, a bin having dimensions dx and dy as shown in FIG. 1. Each bin contains data from the many different source-receiver trajectories that will become the members of a stack. A source/receiver DMO aperture segment, 10, extends along an arbitrarily-chosen azimuth bounded by $S_1$ (source) and $R_1$ (receiver). A second DMO aperture segment 12 extends along a line bounded by a source $S_2$ and receiver $R_2$. Aperture segments 10 and 12 is sampled discretely with symmetrically distributed spaced-apart sample points as shown by black circles such as 16, 18, 20 and 30. The distance $D=(\delta x^2+\delta y^2)^{1/2}$ between any two adjacent spaced-apart sample points such as 16 and 18 is such that D projected onto the grid x axis is less than or equal to dx and D projected onto the y axis is less than or equal to dy where dx and dy are the biaxial cell dimensions as shown in FIG. 4.

Each sample point is now to be interpolated onto the output grid by application of a sampling filter $F(x,y)$ that has a passband within the spatial Nyquist wavenumber as defined by the output grid dimensions. The sampling filter $F(x,y)$ is preferably an exponentially tapered sinc function, centered at the DMO point under interpolation and truncated to a pre-selected number of coefficients derived from the grid points within a (5×5)-point filter support region shown by the squares such as 22, 24 and 26 in FIG. 4. A suitable filter may be formulated from (but is not limited to):

$$F(x_i, y_j)) = C\exp\left(-\Delta\sqrt{X^2 + Y^2}\right)\frac{\sin\pi\alpha X}{\pi\alpha X}\frac{\sin\pi\beta Y}{\pi\beta Y},$$

where $X=(x_i-x_o)/dx$, $Y=(y_j-y_o)/dy$, $x_o, y_o$ are the coordinates of an arbitrary sample point along the DMO aperture segment, such as 24;

$x_i$ and $y_j$ are the coordinates of the filter-support grid points or stack points (shown as squares) which provide the filter coefficients, where $i=j=1, 2, 3, \ldots, n$ and n is an odd number greater than unity;

$\alpha$ and $\beta$ are preselected constants, preferably set at 0.75, for controlling the sinc pass band;

C is an amplitude coefficient, preferably unity; and $\Delta$ is a taper decay constant, preferably 0.5.

The filter support region may include any number of output-grid support points for contribution as filter coefficients. However, from a practical computational standpoint the number of coefficients employed typically might be 25, by way of example but not by way of limitation, as shown in FIG. 4. For each sample point along the DMO aperture segment, the filter-support output grid array is shifted similarly so as to embrace the DMO sample point substantially symmetrically as shown. Thus the filter support region for sample point 30 will overlap a portion of an output grid-point array that comprises the support region for a neighboring DMO sample point such as 32.

Many different DMO aperture segments all having different azimuths may be involved such as segments 10 which is aligned at a different azimuth than segment 12. The above process is repeated for every DMO sample point along every DMO aperture segment. In the case where the aperture segments intersect, such as at sample point 30, the segments may enjoy a common filter support region as shown in FIG. 4.

The DMO response at the sampled point is stacked at each of the output grid points within the filter support array, weighted by the corresponding filter coefficient $F(x_i,y_j)$.

Figure 5:
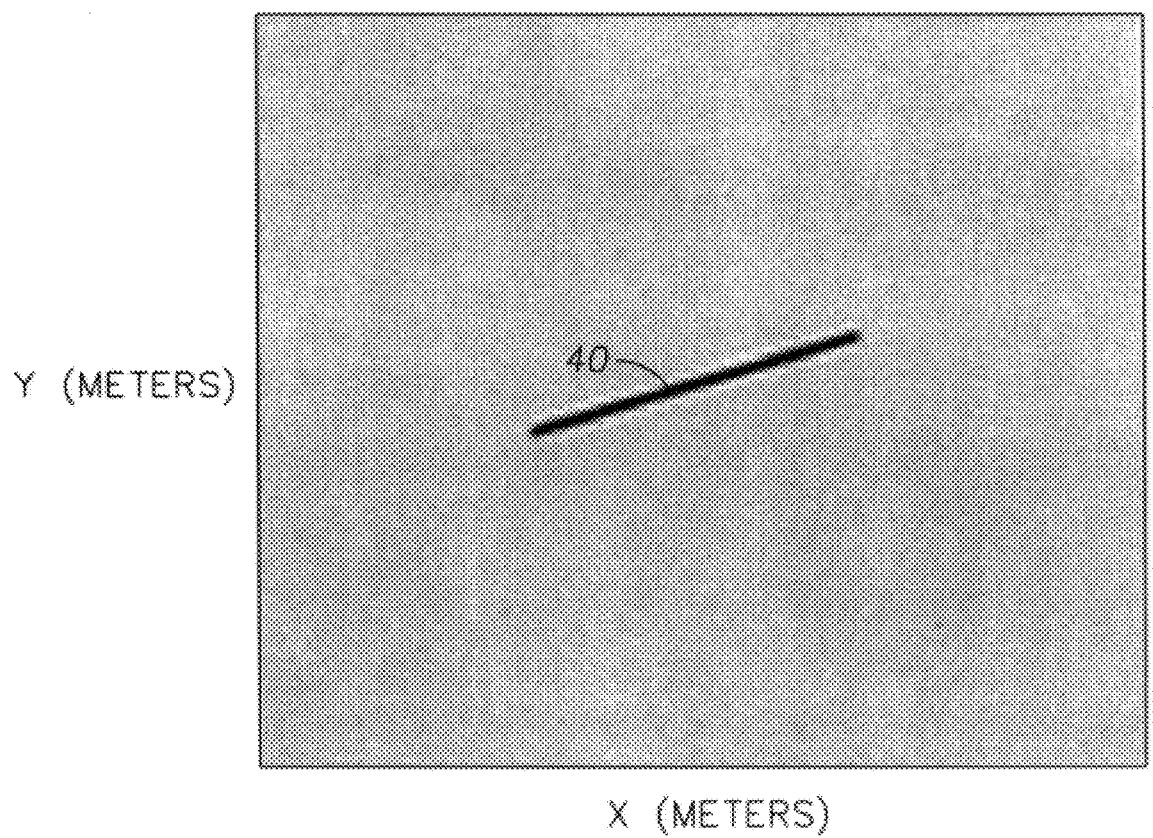
FIG. 5 is the DMO operator generated using the method of this invention.

In FIG. 5, 32 represents the DMO aperture of FIG. 2 but generated using the procedure as above outlined.

Figure 6:
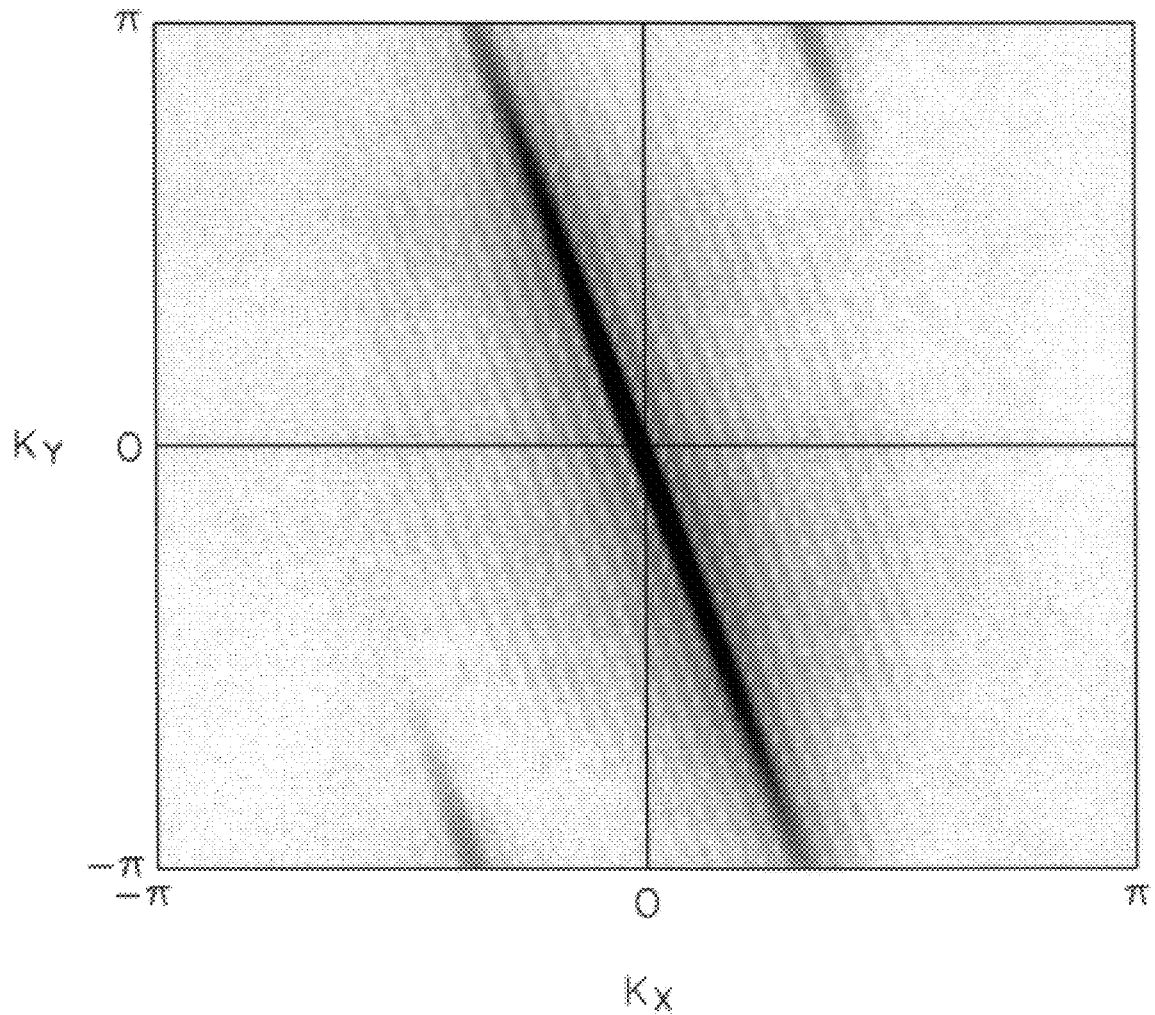
FIG. 6 is the 2-D spectrum of FIG. 5.

FIG. 6 is the spectrum of the operator of FIG. 5, showing that the DMO operator has indeed been de-aliased as desired.

The method of this invention is particularly applicable for use in conjunction with any data-processing routine involving 3-D Kirchhoff DMO in the presence of sparsely- or irregularly-distributed stack output cells such as that disclosed in U.S. Pat. No. 5,206,837 for COMPENSATING FOR THE EFFECT OF IRREGULAR SPATIAL SAMPLING OF SEISMIC WAVEFIELDS issued Apr. 27, 1993 to C. Beasley and R. Katz, or U.S. Pat. No. 5,450,370 for QUALITY ASSURANCE OF SPATIAL SAMPLING FOR DMO, issued Sep. 12, 1995 to C. Beasley et al.

Figure 7:
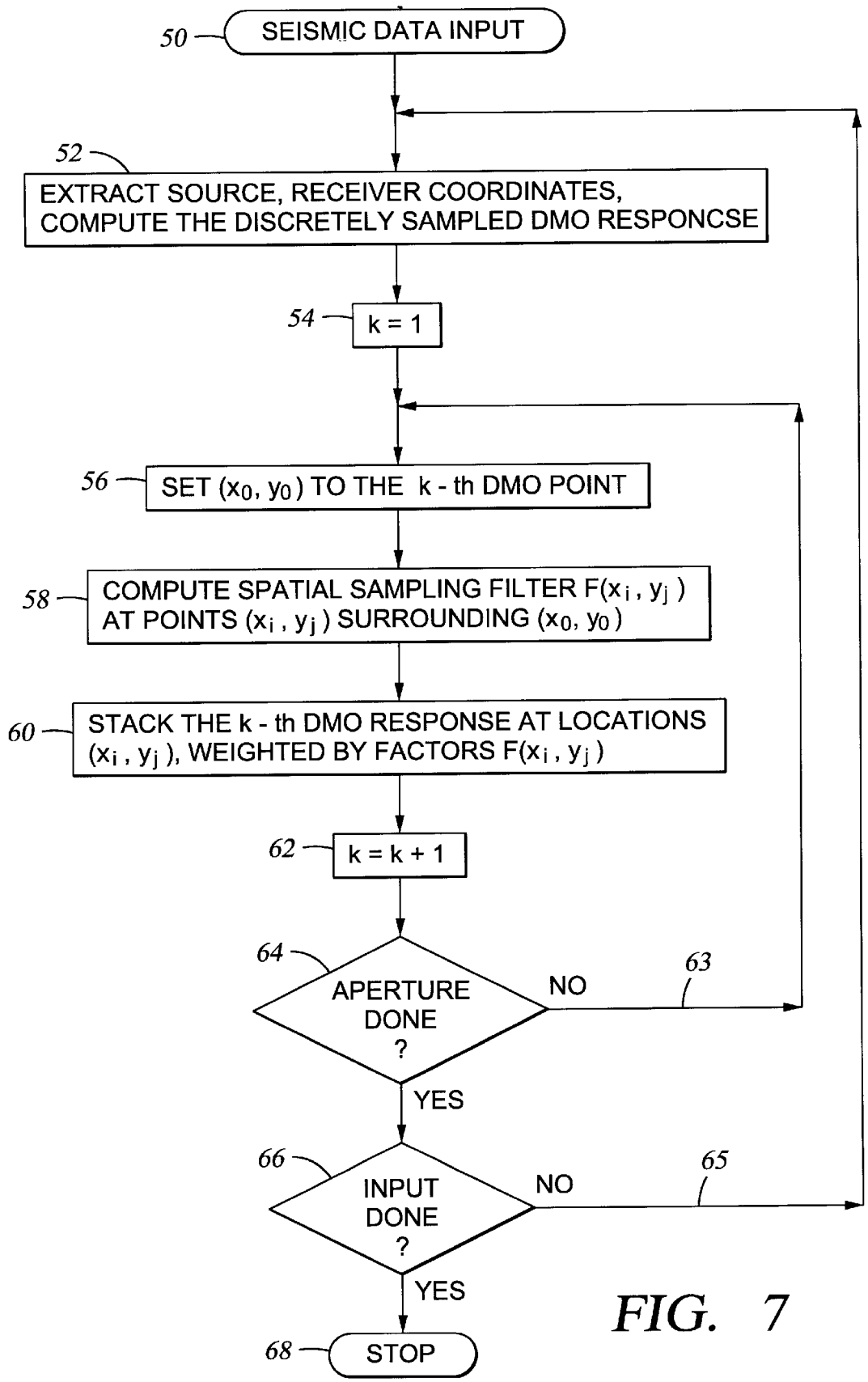
FIG. 7 is a flow diagram listing the steps involved in the method of this invention.

The presently preferred procedure for practicing the process of this invention is best shown by the flow diagram of FIG. 7. At step 50, discrete data samples and the coordinates of the sources and receivers from the respective grid points are input to the process over all aperture segments over all azimuths. The discretely-sampled DMO responses are computed for the source and receiver coordinates at step 52 along a first azimuth. The process is initialized at step 54 by selecting a first arbitrary DMO sample point, k, along a first aperture segment. The coordinates, $(x_o, y_o)$, of the arbitrary sample point are assigned to the k-th DMO point at step 56. At step 58, a spatial sampling filter $F(x_i, y_j)$ is computed at the filter-support stack points that surround the k-th DMO sample point $(x_o, y_o)$. The k-th DMO responses at the locations $(x_i, y_j)$ are weighted by the factors given by filter $F(x_i, y_j)$ and stacked at step 60. Additional DMO sample points, k+1, k+2, etc., are selected at step 62 and the computational steps 56–62 are repeated iteratively for all sample points as shown by feedback loop 63 until all DMO sample points in the first aperture segment are processed at 64. At step 66, the process then loops back to step 52 over feedback loop 65 to iteratively process the aperture segments along additional azimuths. The routine terminates at step 68 when all aperture segments over all azimuths have been processed.

This invention has been described with a certain degree of specificity by way of example but not by way of limitation. Those skilled in the art will devise obvious variations to the examples given herein but which will fall within the scope and spirit of this invention which is limited only by the appended claims.

What is claimed is:

1. A processing method for spatially de-aliasing the impulse response of a 3-D Kirchhoff DMO operator over a DMO aperture segment directed along an arbitrary azimuth with respect to a biaxial output grid of data-signal stack points, the stack points having biaxial boundaries dx and dy of preselected dimensions and distributed over a biaxial spatial grid, comprising:

a) discretely sampling the DMO aperture segment at sample points spaced apart along the aperture segment, the spacing projected onto each coordinate axis being less than or equal to the biaxial cell dimension in that direction;

b) interpolating the DMO response at each sample point onto the output grid by applying a sampling filter having a pass band within the Nyquist wave numbers defined by the output grid dimensions, the filter being truncated to a preselected odd number of weighted filter coefficients derived from grid points within an output-grid support region that substantially symmetrically embraces a sample point under consideration;

c) stacking the filtered DMO response of the sampled point at each of the output grid points within the filter support region for application to the data signals residing at the stack point comprising said output grid.

2. The method as defined by claim 1, wherein:

the weighted filter coefficients are generated from a support region which incorporates an orthogonal biaxial array of $x_i \times y_j$ grid points, where i and j are odd integers greater than unity, the array being centered with respect to a preselected DMO sample point.

3. The method as defined by claim 2, wherein:

the sampling filter function, $F(x_i, y_j)$, is an exponentially tapered sinc function constructed in accordance with the formulation $$F(x_i, y_j) = C \exp\left(-\Delta\sqrt{X^2 + Y^2}\right) \frac{\sin\pi\alpha X}{\pi\alpha X} \frac{\sin\pi\beta Y}{\pi\beta Y}$$

where $X=(x_i-x_o)/dx$, $Y=(y_j-y_o)/dy$, $x_i$ and $y_j$ are the filter-support grid-point coordinates, $x_o$ and $y_o$ are the sample-point coordinates, $\alpha$ and $\beta$ are constants that control the pass band of the filter, C is an amplitude coefficient and $\Delta$ is an exponential decay constant.

4. The method as defined by claim 1, comprising:

repeating steps a) through c) for every sample point along a DMO aperture segment.

5. The method as defined by claim 1, comprising:

establishing a plurality of DMO aperture segments along a plurality of preselected azimuths and repeating steps a) through c) for every sample point along every DMO aperture segment.

6. The method as defined by claim 4 or 5, comprising:

for each sample point, shifting the grid points constituting the filter support region, so as to substantially symmetrically contain each sample point as the respective sample points are processed in a desired sequence along the aperture segment.

7. The method as defined by claim 1, wherein the weighted filter coefficients are generated from a support region which incorporates a non-orthogonal biaxial array of $x_i \times y_j$ grid points, where i and j are odd integers greater than unity, the array being centered with respect to a preselected DMO sample point.

* * * * *